(12) United States Patent
Hodges et al.

(10) Patent No.: US 8,954,990 B2
(45) Date of Patent: Feb. 10, 2015

(54) ADAPTABLE MASS DATA MESSAGE RECEIPT AND HANDLING SYSTEM AND METHOD

(71) Applicant: NBCUniversal Media, LLC, New York, NY (US)

(72) Inventors: Jonathan Reed Hodges, Denver, CO (US); Emre Celik, Altadena, CA (US)

(73) Assignee: NBCUniversal Media, LLC, Wilmington, DE (US)

( * ) Notice: Subject to any disclaimer, the term of this patent is extended or adjusted under 35 U.S.C. 154(b) by 0 days.

(21) Appl. No.: 13/656,104

(22) Filed: Oct. 19, 2012

(65) Prior Publication Data

US 2014/0115605 A1 Apr. 24, 2014

(51) Int. Cl.
*G06F 9/46* (2006.01)
*G06F 9/54* (2006.01)

(52) U.S. Cl.
CPC . *G06F 9/542* (2013.01); *G06F 9/54* (2013.01)
USPC .......................................... 719/313; 719/318

(58) Field of Classification Search
None
See application file for complete search history.

(56) References Cited

U.S. PATENT DOCUMENTS

| 7,814,218 | B1* | 10/2010 | Knee et al. | 709/230 |
|---|---|---|---|---|
| 8,414,397 | B2* | 4/2013 | Block et al. | 463/42 |
| 2004/0068479 | A1* | 4/2004 | Wolfson et al. | 707/1 |
| 2011/0161436 | A1* | 6/2011 | Moore | 709/206 |
| 2012/0210335 | A1* | 8/2012 | Salt et al. | 719/315 |
| 2012/0322550 | A1* | 12/2012 | Antkowiak et al. | 463/29 |
| 2013/0080348 | A1* | 3/2013 | Pantaliano et al. | 705/347 |

\* cited by examiner

*Primary Examiner* — Charles E Anya
(74) *Attorney, Agent, or Firm* — Fletcher Yoder, P.C.

(57) ABSTRACT

Compact event code messages are generated by sources, which may include human users, system components or any other sources. The event code messages include an event type, a source type, and a date. The messages are initially processed based on this information. The messages also include payload data that is not considered during initial processing, rendering initial processing fast and efficient. The messages may then be listed or queued and further processed by specialize event handlers, which may consider the payload data and may draw upon other resources. The system components, including the event handlers may be increased or decreased as needed and dynamically as messages are received and processed. New events, rules for event processing, event handlers and other system components may be added at any time to expend the number and types of events that can be handled, and the particular handling performed on them.

26 Claims, 5 Drawing Sheets

ADAPTABLE MASS DATA MESSAGE RECEIPT AND HANDLING SYSTEM AND METHOD

BACKGROUND

The present invention relates generally to the field of data handling systems for receiving and processing a large number of messages or events. The invention relates particularly to a fast and efficient technique based upon eventing paradigms that allow for incoming messages or events to be initially processed, listed or cataloged, and later processed in a manner that allows for flexible scaling, expansion, and contraction of available resources.

A wide array of systems and techniques have been developed for handling messages and events (or more generally discrete data transmissions). These include Internet packet transmission and receipt, packet handling, email and text message distribution and handling, and so forth. A special class of such systems has been adapted for receiving event data or messages from users in particular communities, particularly users of specific games, activities, software, and viewers and listeners who tune in to broadcast, Internet and other content dissemination sources. Special challenges exist in handling this type of information. First, a very wide array of sources of events may need to be accommodated. Further, the range of different events may be very broad, depending upon the particular sources and the activities concerned. Moreover, substantial periods may go by when little or no activity is present, followed by periods of greatly increased activity.

By way of example, users of on- and off-lined gaming may interact with games in ways that create a significant number of events. These events may be transmitted to a monitoring entity, cataloged, tracked and so forth in ways that affect the player or other players. In the television broadcast arena, popular shows, such as talent competitions, may call for votes from viewers that will arrive in vast numbers in a relatively short period of time. In many web environments, it may be useful to detect, track and analyze a myriad of events, as minute as clicking on a particular link or resource. Many other examples of such massive event creation can be provided, with the number and diversity of such events increasing constantly.

Challenges with this type of event creation, communication, cataloging, and processing include the ability to respond to a vast array of different sources and events, in a way that allows for the system to respond quickly, with little lag time, despite significant increases and decreases in the number and types of events. Systems exist for expansion and contraction of such resources, but improvements are needed, such as in the basis and manner of making such flexible changes in resources, as well as in the manner in which the events are created, communicated and initially processed to permit adequate responses and alteration of the allocated resources.

BRIEF DESCRIPTION

The present invention provides innovations in the creation, communication and response to a wide range of events to respond such needs. In accordance with aspects of the invention, a method for processing event data, comprises receiving event code messages from a plurality of sources, the event code messages comprising code indicative of an event type, an event source, a date, and a payload. The event code messages are added to a list of messages to be processed. The listed messages are initially processed by applying rules to the listed messages based upon the event type, the event source and the date. The initially processed messages are added to a results list. Further processing is then performed on the messages from the results list based upon the initial processing.

In accordance with another aspect of the invention, a method for processing event data, comprises receiving event code messages from a plurality of sources, the event code messages comprising code indicative of an event type, an event source, a date, and a payload. The event code messages are added to a list of messages to be processed, and the listed messages are initially processed by applying rules to the listed messages based upon the event type, the event source and the date. The initially processed messages are added to a results list. Event handler resources are dynamically increased or decreased for further processing of the initially processed events based upon a parameter derived from the list of messages or the results list. Further processing is performed on the messages from the results list by event handlers based upon the initial processing.

The invention also provides a system for processing event data that comprises an event code message initial processing subsystem comprising a component that receives event code messages from a plurality of sources, the event code messages comprising code indicative of an event type, an event source, a date, and a payload, the initial processing subsystem being configured to initially process received messages by applying rules to the listed messages based upon the event type, the event source and the date. A plurality of specialized event handlers are configured to perform further processing of the messages based upon the initial processing.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
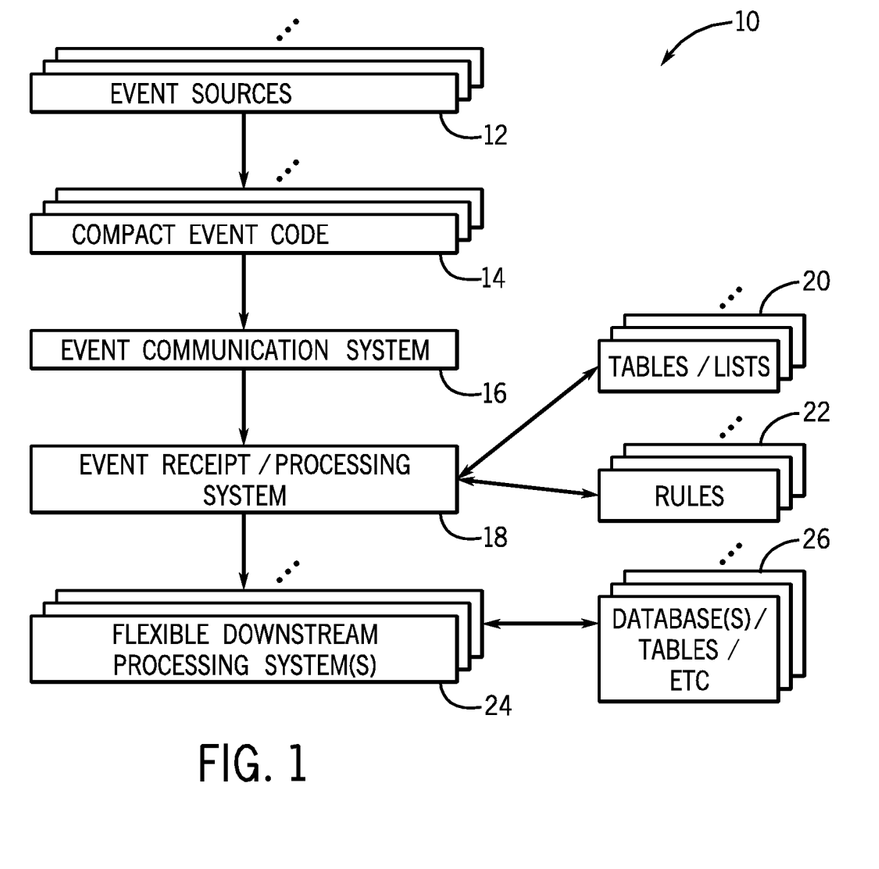
FIG. 1 is a diagrammatical representation of a data processing system for handling messages and events in accordance with aspects of the present techniques.

Turning to drawings, FIG. 1 illustrates and exemplary data processing system 10 designed to handle large volumes of event messages from a variety of sources. In the illustration of FIG. 1, event sources are indicated by reference numeral 12. These sources may be very diverse in nature, and may change during use of the system, making the system highly adaptable to different sources, types of sources, and types of events. In general, the sources will interact with separate devices linked by one or more networks, such as the Internet. The sources may include such devices as personal computers, laptop computers, tablet computers, personal digital assistance, cellular telephones, multi-function devices, televisions, or any other suitable device. The sources may also include, however, elements of the data processing system itself, such as servers, event handlers (discussed below), and so forth.

The event sources produce compact event code messages as indicated generally by reference numeral 14. These event code messages are highly efficient insomuch as they provide sufficient detail for initial processing of the events, but may make reference to other resources to allow much more detailed analysis and processing after initial receipt and analysis. More detail is provided below regarding the compact event code messages. In presently contemplated embodiments, these messages are generated by interaction of the event sources with system resources, such as web services. The compact event code messages 14 are communicated to an event communication system as indicated by reference numeral 16. This event communication system may provide the web services for a generation of the messages. The communication system also allows for receipt of the messages, cataloging or listing of the messages, and passing the messages along to an event receipt/processing system 18 for initial processing. The event communication system itself may comprise a series of servers, databases, and relevant software to permit creation of the event messages, and receipt of the messages. As discussed in greater detail below, because very high volumes of messages may occur in short durations, followed by durations with relatively fewer messages, the event communication system 16 is adapted for receipt of the messages regardless of the volume, as well as for rapid handling of the messages, and listing or queuing of the messages for further processing. The event communication system may be dynamically expanded and contracted, as also discussed below, to permit substantial variation in message volume.

The event receipt/processing system 18 handles initial processing of the received messages. Essentially, this system will analyze certain code contained in the messages and will write to and read from tables and lists 20 to perform initial analysis on how the individual messages should be processed. Because the event sources and the nature of the messages may vary substantially, and because these can be altered at will by system administrators, the event receipt/processing system 18 is highly adaptable by reference to the tables and lists, and by reference to rules 22 which are applied to initial processing. In general, the rules will be pre-established and may be altered during evolution of the system. The rules may be set to apply to particular types of messages, particular sources, particular events, particular actions, and so forth. The initial processing performed by the event receipt/processing system 18 will be based upon such rules and following application of the rules the initial processing will rapidly direct the events for downstream processing.

One or more flexible downstream processing systems 24 then perform specific actions with respect to the event messages. These actions may be defined by additional rules implemented by the downstream processing systems, as well as by reference to databases, tables and so forth, as indicated by reference numeral 26. The resources drawn upon by the flexible downstream processing systems may be based upon the particular compact data that comprises the event code messages. It may also be based upon payload data that is not initially considered during the initial processing, but that defines specific content, activities and so forth to be performed by the processing systems. The processing systems may perform simple operations such as noting events and lists, associating events with particular sources, associating similar events with one another, counting events, monitoring events, and so forth. Here again, as with other resources, the flexible downstream processing systems are indicated as "flexible" insomuch as they may be expanded and contracted at will, including during real-time operation of the system.

As used herein, the real-time expansion or contraction of resources is intended to indicate that these resources may be altered in number and capacity based upon such factors as the number of events being created in particular periods, the number of events being listed and initially processed, time or periods or delays for processing events, and so forth. In addition, real-time alteration of these resources implies that the resources are changed during the receipt and processing of event messages, making the system highly adaptable and dynamic in nature. For example, as the number of events or the time for processing the events increases, a rate of increase can be analyzed to increase the resources attributable to downstream processing. The same is true for contraction of these resources as event receipt decreases. Additional detail is provided below regarding this feature of the invention.

Figure 2:
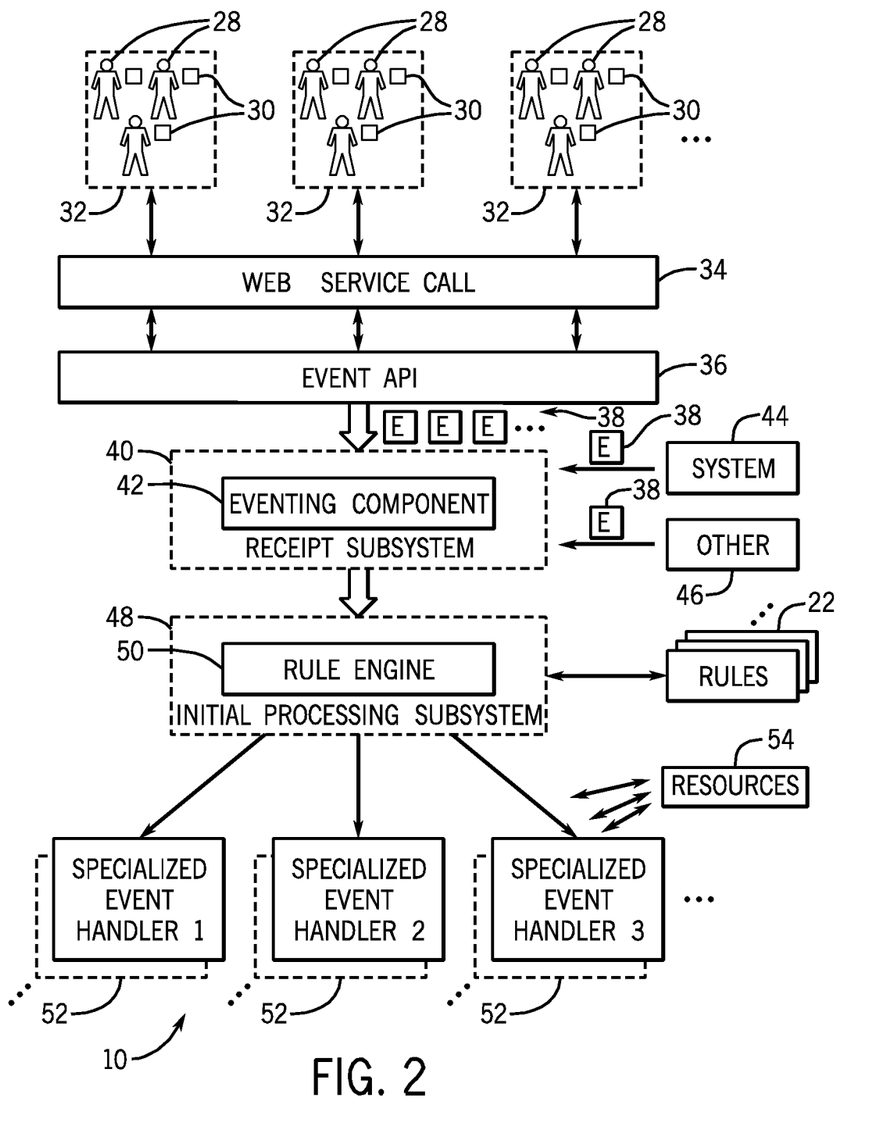
FIG. 2 is a diagrammatical representation of the system of FIG. 1 in somewhat greater detail, illustrating certain functional components in the presently contemplated embodiment.

FIG. 2 shows a somewhat more detailed diagrammatical view of certain of the functional components of the system. As shown in FIG. 2, users 28 will typically interface with one of a variety of devices indicated generally by reference numeral 30. Again, these may be any suitable electronic devices, which most often will be capable of displaying video, still pictures, playing audio, receiving and playing broadcast and Internet transmissions, playing back recorded content, and so forth. Moreover, the devices may work in conjunction with other systems and devices that the users have at their disposal. That is, for example, a cellular telephone, computer, tablet or similar device may be used to interact with the system while the user is viewing or otherwise enjoying content on a separate device. Such scenarios may arise, for example, for voting events where a user interacts with a cellular telephone or computer to vote for a contestant on a competition show that is being viewed on separate television. These and many other devices may be a source of the interactions between the users and the system. Moreover, the users and devices may be, where appropriate, group into populations or communities 32. Members of such populations may have a logical association with one another, such as players of a certain game, voters for a certain televised competition, and so forth. As summarized below, such populations may form groups that can serve as the basis for initial and subsequent processing of event messages.

As indicated at reference numeral 34, in a presently contemplated embodiment interaction for the creation of event messages begins with a web service call. The web service call draws upon an event application programming interface (API) as indicated at step 36. It should be noted that this is only one possible entry point for eventing in the system, although it is contemplated that this may be a significant point, particularly where human users or sources are involved. The event API and web service call interact with the source to collect necessary information from the source for generation of the event code. For example, as summarized below, the compact event code may include indication of the source, indication of an event type, indication of the date, and certain other information that may be considered in a payload of the message. In the presently contemplated embodiment, the API call adds a message onto a queue for initial processing. The events 38 thus flow into a receipt sub-system 40 which comprises and eventing component 42. Other event sources are illustrated in FIG. 2, such as a system source 44 and various other sources 46. The system source may comprise any one of the components of the data processing system, and may serve to flag errors, processing loads, traffic monitoring, or any other function. Other sources may include, for example, automated sources that can also generate events independent of human participants.

The eventing component 42 monitors the queue of event messages and extracts the messages from the queue for creation of an event table as discussed below. In a presently contemplated embodiment, the eventing component 42 draws the oldest message and proceeds accordingly in the queue. Here again, it should be noted that although one eventing component and receipt sub-system is illustrated, more than one and indeed many such sub-systems and components may be employed. Moreover, these resources may also be expanded and contracted depending upon the anticipated or actual flow of events from the sources.

Initial processing continues through an initial processing sub-system 48 that makes use of a rule engine 50. The rule engine 50 draws upon rules 22 and applies these rules to the compact event code messages as they are drawn from the incoming queue. To process the events, relevant rules are predefined and are related to event type, source type, and a date or date range as described in more detail below. The rules will typically be fairly straightforward at this point, and may comprise, for example, simple listings, counts, adding of names or events to a running total, and so forth. More sophisticated rules may also be envisaged, and these may be defined in advance based upon the particular event definition to which the rules apply. As before, the initial processing sub-system 48 and the rule engine 50 may comprise a single system or multiple systems may be employed, each being expandable or contractable depending upon the system load.

The initial processing sub-system thus completes the initial processing based upon the compact event code messages and allows for subsequent, typically more detailed processing to be carried out by specialized event handlers, as indicated by reference numerals 52. These specialized event handlers will typically be specialized in the sense that they are adapted for handling specific types of events, specific sources, specific actions or activities to be performed based upon the event code messages, and so forth. The initial processing and passing along of the messages for specialized event handling is particularly important insomuch as it allows for adaptation and expansion/contraction of the system to newly created or different events, rapid intake and initial processing of events followed by subsequent, often slower processing by specialized event handlers, application of more complex rules after initial receipt and processing of the events, and so forth. In general, the specialized event handlers may draw upon or write to a wide range of resources as indicated generally by reference numeral 54. For example, based upon certain actions, content, facts, groups, and so forth encoded in the payload of the event code messages, additional resources may be drawn upon, such as to provide content to users, log certain key events taking place as indicated by the messages, and so forth. The resources may also allow for recording a wide range of activities by the users and their devices, and these activities may be analyzed or processed to carry out more complex functionality, such as tracking play and points of interactive game players, tracking clicking events to indicated interest in certain subject matter, tracking of votes in response to a competition, and so forth. It should also be noted that, as mentioned above, as additional events become of interest or are created, these may be added to the system along with one or more specialized event handlers to perform detailed processing on the events. Finally, it should be noted that any of the specialized event handlers may be designated for specialized handling of certain events, or the events may be handled by more than one of the handlers, where appropriate. This may allow for different handling of individual events as well as for expansion and contraction of the system as desired, such as in response to system load.

Figure 3:
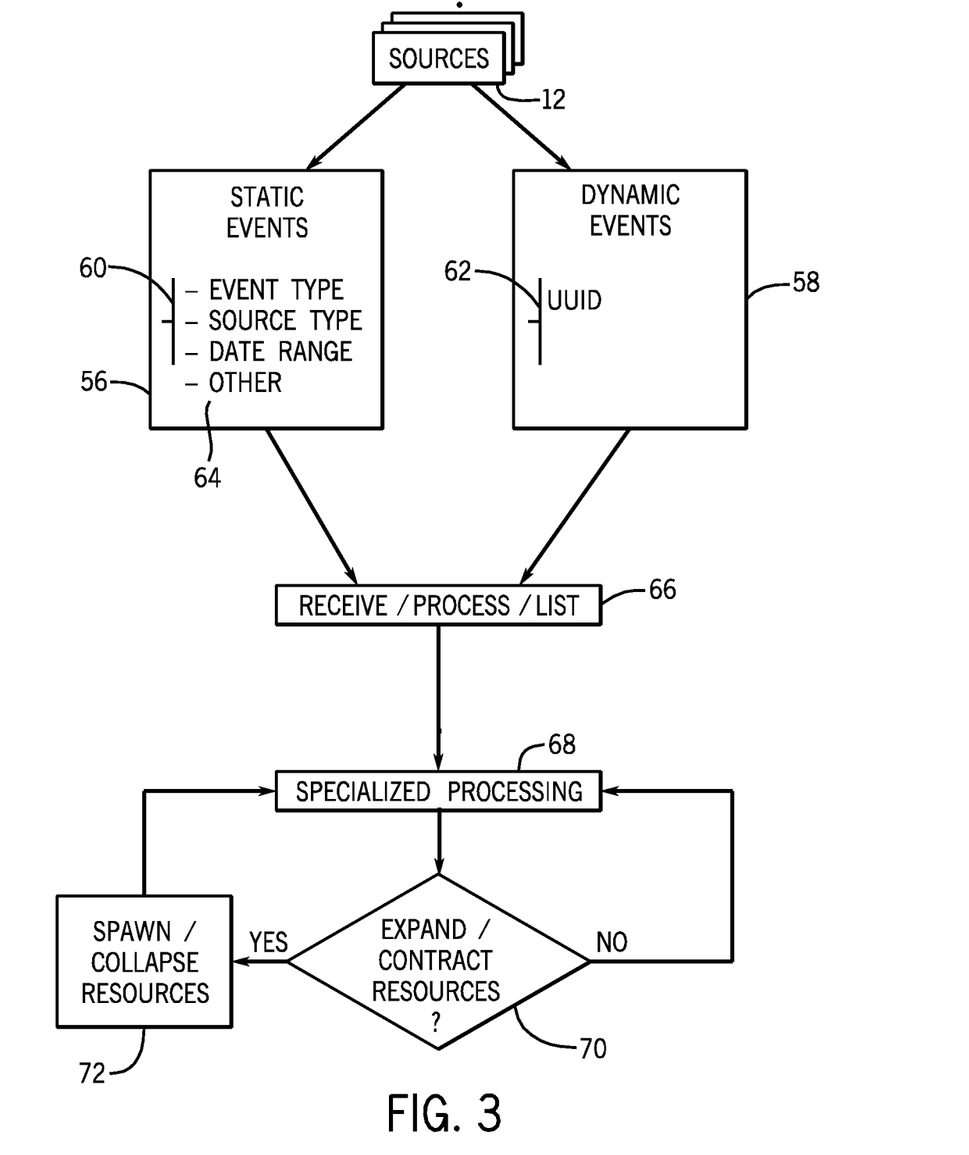
FIG. 3 is a flow chart illustrating different types of events and how they are processed from a high level.

FIG. 3 illustrates certain aspects of the eventing code and its processing in accordance with a presently contemplated embodiment. As noted above, sources 12 will give rise to events that themselves are captured in compact event code messages. In a presently contemplated embodiment, two general types of events may be defined. First, static events 56 will typically have a preset protocol which makes use of certain elemental components. A dynamic event 58 may also be created that does not strictly conform to this protocol and which may be handled in a different manner. In the present embodiment illustrated in FIG. 3, the static events each comprise an event definition as indicated by reference numeral 60. This event definition for static events may include three primary components, including an event type, a source type, and a date or date range. Based upon these simple components, then, rapid event handling can be performed during the initial processing phase. In the case of dynamic events, a universally unique identifier (UUID) is employed to ensure no collisions with predefined codes in the system. One or both of these types of events will typically also include other information as indicated by reference numeral 64. In accordance with certain presently contemplated embodiments, this other information, particularly in the case of static events, may include a payload which supplements the basic event definition and allows for more detailed subsequent processing by the event handlers.

By way of example, below are listed a series of exemplary event type codes that may comprise the compact event code messages.

Event type ex. 1: content.video.watch.network

Event type ex. 2 content.article.share.site-421.socialnetworkingsite

Event type ex. 3: person.profile.avatar.upload.site-223.network

Event type ex. 4: person.vote.site-221.socialnetworkingsite

Event type ex. 5: game.high.score.site-421.network

Event type ex. 6: server.eventing.subsystem.exception.tvnetwork

Event type ex. 7: server.database.subsystem.unavailable.tvnetwork

In each of these exemplary event types, data is provided that indicates a domain, a detail or action, and a namespace or site. For instance, example 1 indicates that a generic video is being watched on a broadcast network. Example 2 indicates that a site article for a particular television program is being shared on a social networking site. Example 3 indicates that a human user has uploaded a profile avatar for a particular television series website of a broadcast network. Example 4 indicates that a human user is voting for a contestant in a televised talent competition program via a social networking site. Example 5 indicates that a user obtained a high score on a game oriented to a particular television series via a site for the series on a network. Example 6 indicates that an exception event has occurred on a subsystem in the environment of a television network. Finally, example 7 indicates that a subsystem database has become unavailable in a television network environment. Clearly, certain of these event types are illustrative of user activities, while the last two are illustrative of system-generated events. Each of the event types will typically be pre-defined, however, along with rules for the events. It should be noted from these examples that many different event types may be defined for many different combinations of domains, details or activities, and namespaces.

Moreover, source type codes may include, for example, a person, a server, a community or group, a site, and so forth. The date or date range component of the event messages is self explanatory.

By way of further example, below are examples of XML code that may define event messages, each including event types, source types, and date or date ranges of the types discussed above:

Compact Event Code Message Ex. 1:

```
<event>
    <version>1.0</version>
    <eventCode>content.video.watch.tvnetwork</eventCode>
    <sourceCode>person</sourceCode>
    <sourceSystemCode>SNAS</sourceSystemCode>
    <sourceUUID>9cbfe50740d2c33f05c868e1b9156a94</sourceUUID>
    <contentUrl>http://www.tvnetwork.com/movies-specials-
        more/video/london-2012-olympics/1401432/</contentUrl>
    <date>2012-07-05T16:05:28.215-04:00</date>
</event>
```

This event message carries the event type "content.video-.watch.tvnetwork", the source type "person" and the date stamp "2012-07-05T16:05:28.215-04:00". Moreover, the payload of the message indicates a specific unique identifier for the person originating the event, "9cbfe50740d2c33f05c868e1b9156a94" and the location where data on the person may be located "SNAS". Moreover, the payload indicates particular content being watched by the user, in this case a segment of the 2012 London Olympic games on a particular television network. The initial processing will be based upon the event type, the source type, and the date, while more specialized processing may be based upon the particular user watching and the content being watched. The specialized event handler conducting the downstream processing will have access to resources where details relating to the person and the content are available. The handler will be designed to interface with any such resources as may be needed for carrying out the specialized processing desired based upon such access.

Compact Event Code Message Ex. 2:

```
<event>
    <version>1.0</version>
    <eventCode>person.vote.site-221.socialnetworkingsite</eventCode>
    <factCode>artist</factCode>
    <factSourceSystemCode>vote</factSourceSystemCode>
    <factUUID>1cb251ec0d568de6a929b520c4aed8d1</factUUID>
    <factValue>Contestant%20One</factValue>
    <sourceCode>person</sourceCode>
    <sourceSystemCode>SNAS</sourceSystemCode>
    <sourceUUID>9cbfe50740d2c33f05c868e1b9156a94</sourceUUID>
    <date>2012-05-03T09:13:17.375-02:00</date>
</event>
```

In this example, the event type is "person.vote.site-221.socialnetworkingsite", the source type is "person" and the date is "2012-05-03T09:13:17.375-02:00". The payload, here again, indicates where details regarding the person can be found as well as the unique code for the person. It also includes "fact" codes that indicate the activity performed. In this case, the person is voting for "Contestant One" on a particular televised competition via a voting space of a social networking website.

Compact Event Code Message Ex. 3:

```
<event>
    <version>1.0</version>
        <eventCode>server.eventing.subsystem.exception.tvnetwork</e
            ventCode>
    <sourceCode>server</sourceCode>
    <sourceSystemCode>eventing</sourceSystemCode>
    <sourceUUID>9cbfe50740d2c33f05c868e1b9156a94</sourceUUID>
    <factCode>exception</factCode>
    <factSourceSystemCode>eventing</factSourceSystemCode>
    <factUUID>6f4257eca091ccc41c5fcdef85e39b32</factUUID>
    <factValue>java.lang.NullPointerExceptionatorg.hibernate.cfg.SettingsF
        actory.buildSettings(SettingsFactory.java:151)atorg.hibernate.cfg.Co
        nfiguration.buildSettingsInternal(Configuration.java:2119)atorg.hiber
        nate.cfg.Configuration.buildSettings(Configuration.java:2115)atorg.h
        ibernate.cfg.Configuration.buildSessionFactory(Configuration.java:1
        339)atorg.springframework.orm.hibernate3.LocalSessionFactoryBean
        .newSessionFactory(LocalSessionFactoryBean.java:855)atorg.springf
        ramework.orm.hibernate3.LocalSessionFactoryBean.buildSessionFac
        tory(LocalSessionFactoryBean.java:774)atorg.springframework.orm.
        hibernate3.AbstractSessionFactoryBean.afterPropertiesSet(AbstractS
        essionFactoryBean.java:211)atorg.springframework.beans.factory.sup
        port.AbstractAutowireCapableBeanFactory.invokeInitMethods(Abstr
        actAutowireCapableBeanFactory.java:1460)atorg.springframework.b
        eans.factory.support.AbstractAutowireCapableBeanFactory.initialize
        Bean(AbstractAutowireCapableBeanFactory.java:1400)</factValue>
    <date>2012-06-11T18:41:21.721-03:00</date>
</event>
```

This system event indicates that a subsystem server exception has occurred in a television network environment. The event type is "server.eventing.subsystem.exception.tvnetwork", the source type is "server" and the date is "2012-06-11T18: 41:21.721-03:00". The payload provides details regarding the particular source server and the exception event.

Compact Event Code Message Ex. 4:

```
<event>
    <version>1.0</version>
```

```
        <eventCode>5a496142424d58c317eac51ac5d4c898</eventCode>
        <sourceCode>person</sourceCode>
        <sourceSystemCode>SNAS</sourceSystemCode>
        <sourceUUID>9cbfe50740d2c33f05c868e1b9156a94</sourceUUID>
        <contentUrl>http://my.tvnetwork.com/xxx/challenges</contentUrl>
        <callBackUrl>http://www.tvnetwork.com/xxx/callback</callBackUrl>
        <date>2012-07-05T11:52:48.641-01:00</date>
</event>
```

Here, the source type is again a "person" as defined by the UUID, and the event type is "5a496142424d58c317eac51ac5d4c898", which here is a UUID, indicative of a "dynamic event" rather than a "static event". The payload indicates, again, where details regarding the person may be located, and where particular content and an activity can be found. This event message relates to a user taking a dynamic "xxx" challenge created by a third party, "xxx".

Continuing with FIG. 3, at block 66 the event messages are received, processed and listed as discussed below, and as discussed in greater detail below with reference to FIG. 4. Once initially processed and listed, then, specialized processing may take place as indicated at step 88. Based upon the initial processing and the specialized processing, decisions may be made, as indicated at step 70 whether to add resources or to withdraw resources from any one of the components or processes of the system. If resources are sufficient for the present purposes, the specialized processing may continue. If the resources are insufficient or superfluous, the decision may result in spawning new resources or collapsing the resources as indicated at block 72 in FIG. 3. It should be noted that this adaptation of the system is carried out in real-time or near real-time, that is, as the event messages are received and initially processed. It should also be pointed out that the specialized processing carried out at block 68 occurs concurrently with the receipt of additional event messages.

Figure 4:
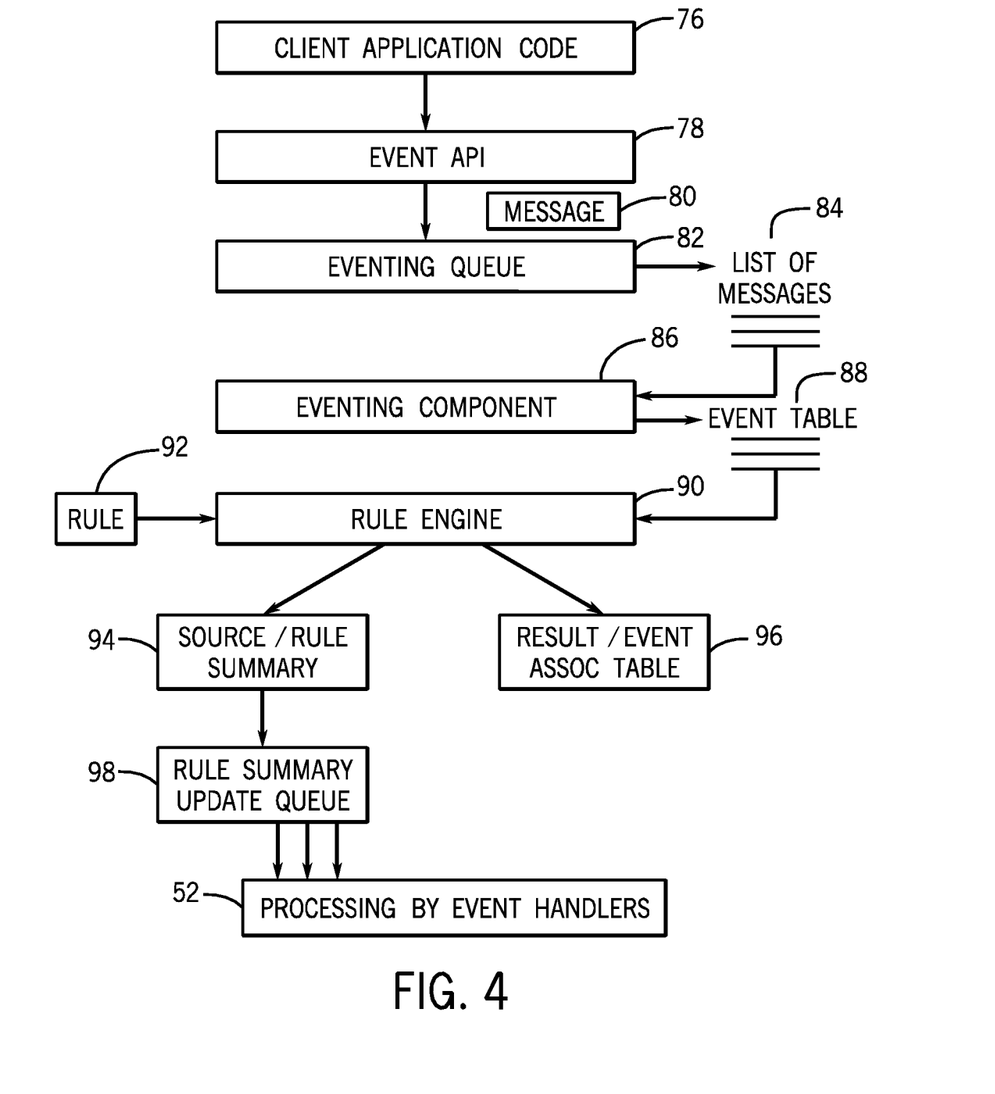
FIG. 4 is flow chart illustrating a presently contemplated detailed technique for receiving and processing events.

FIG. 4 illustrates in somewhat greater detail a presently contemplated flow of processing components for initial processing of the compact event code messages. As noted above, the initial creation of the messages may begin with a client application code 76 that interacts with event API, such as via a web service call. The client application code may be operational to perform one of many different tasks on a user device, such as gaming, voting, playback of video and music, or any other activity. The event API 78, then, creates the messages indicated by reference numeral 80. This message is received and passed along to an eventing queue 82. The eventing queue creates a list of messages 84 as the messages are received. The eventing component 86, then draws from this list of messages as indicated above, typically from the oldest message first. The eventing component then creates an entry in an event table 88 or further processing. In this presently contemplated embodiment, creation of the event table ensures that even if a problem arises with later processing, the original event is always captured so that the processing can be retried.

Based upon this event table, then, the rule engine 90 applies one or more rules 92 that are executed to produce result entries. These results are the consequence of application of the rules on the coded messages, and a result may require several event occurrences to be fully completed. Upon completion application of the rules by the rule engine, then, a source/rule summary is created as indicated by reference numeral 94. In this presently contemplated embodiment, if this is the first time the specific combination of the particular source and a particular rule have been applied, a new entry is created into the summary, otherwise and existing entry is updated. Each result is a further maintained in a list of all the events that contributed to it via a result/event association table 96. This result/event association table may be thought of as a master list that contains all events, whereas in the presently contemplated embodiment, the source/rule summary only records the most recent result which contributed to the summary, rather than all results. As the source/rule summary entries are created, they are placed on a rule summary update queue as indicated by reference numeral 98. This makes them available for further processing by downstream systems, such as for monitoring, tabulation, analysis, and so forth. As noted above, this further processing is carried out by one or more event handlers as indicated by reference numeral 52.

Figure 5:
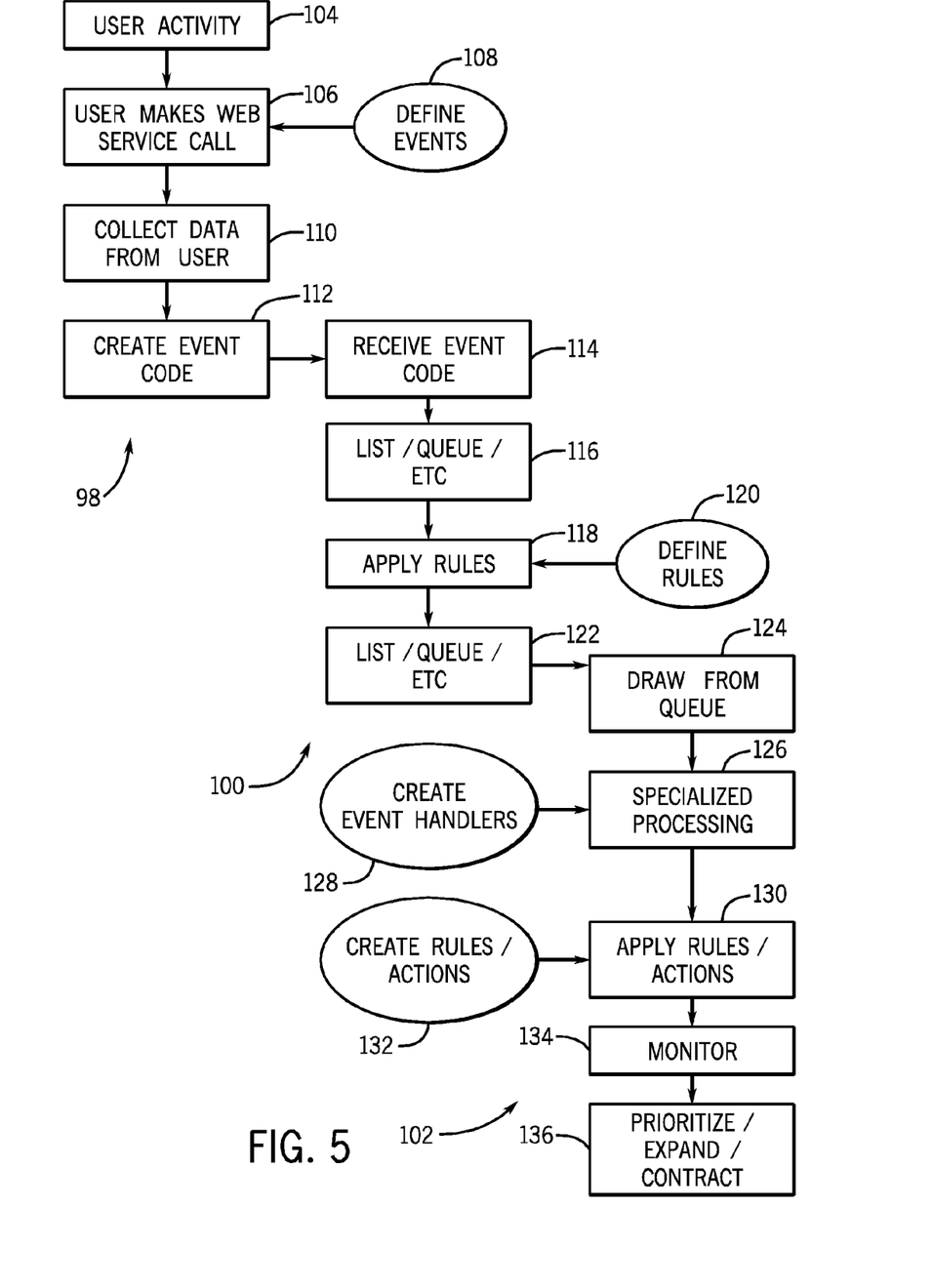
FIG. 5 is a flow chart illustrating exemplary logic carried out for initial event message creation, initial processing, and detailed or specialized process in a system of the type illustrated in the previous figures.

FIG. 5 illustrates the more detailed processing discussed above, broken into segments that are generally performed with initial user initiated activities as indicated by reference numeral 98, then through initial processing activities 100, and finally through specialized processing activities 102. As noted above, the user initiated activities began with some user activity 104. Here again, it should be noted that where the present example employs the term "user" more generally this should refer to a source which may be a human interacting with a device or any other automated, semi-automated or manual source. During or following this activity, then, a web service call is made by the user or source as indicated by reference numeral 106. To enable the web service call and the creation of a compact event code message, desired events are defined as indicated by reference numeral 108. These, again, may be defined during establishment of the overall data processing system, or at any time after commissioning of the system. Any desired entity may create such events and these events will typically conform to the protocol, at least for static events, described above. That is, the event definitions will typically 7 include specification of event types, source types, a date field, any desired payload that may be anticipated, as well as any rules that are associated with the events. During creation of the event code, certain data is collected from the user or source as indicated by reference numeral 110. Again, such data may include the identification of the user or source, and identification of the type of event or activity, identification of the date (and time), as well as identification or capture of any additional data that may be useful in processing the event. This data may make up at least part of the event type component, and may also form part of the payload of the event as noted above. The activities 98 culminate in the creation of the event code message as indicated at reference numeral 112.

The initial processing activities 100 may be summarized as beginning with the receipt of the event code messages as indicated by reference numeral 114, followed by listing, queuing or otherwise storing the received messages. Based upon the received and stored messages, then, the initial rules are applied as indicated by reference numeral 118. As with the basic definition of the events, the rules apply at step 118 result from definition of the rules as indicated by block 120. Such definition will typically take place at the time the different event types are created or defined, although rules may be changed, added or removed during operation of the system. Finally, the initial processing activities culminate with listing, queuing or otherwise cataloging the initially processed event code messages and the results of application of the rules.

Specialized processing 102 may begin with drawing the event code messages from the queue as indicated at step 124. Specialized processing is then performed as indicated at step 126, and this processing is carried out by event handlers that have been created as indicated by block 128. As noted above, the different types of handlers, their activities, the resources drawn upon by each of the handlers, and the resources represented by the individual handlers or collection of handlers may be expanded or contracted depending upon such factors as event loads, system loads, time or delay in processing, and so forth. The specialized processing 126 proceeds with application of specialized rules and actions as indicated by step 130. Here again, these rules and actions will have been defined in advance as indicated by block 132. The rules and actions may vary widely depending upon the nature of the event and the way in which the system designer intends the event to be handled. At block 134 the system may monitor for the processing of the event handlers or indeed of any one or all of the various components and functions of the system. Based upon such monitoring, which may be performed cyclically or continuously through operation of the components, events may be prioritized, resources may be expanded or contracted, and so forth as indicated at step 136. For example, certain types of events may be handled with higher priority than others, and in presently contemplated embodiments, events having source types that are persons or communities may be handled with higher priority than system-originating events, for example.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for processing event data, comprising:
   receiving event code messages from a plurality of sources, each event code message describing an event, from a set of pre-defined events that may occur at one or more of the plurality of sources that has occurred at a particular source of the plurality of sources, the event code messages comprising code indicative of an event type corresponding to the event that has occurred, an event source corresponding to the particular source where the event occurred, a date that the one or more pre-defined events occurred, and a payload corresponding to the event that has occurred;
   adding the event code messages to a list of messages to be processed;
   initially processing the listed messages by applying rules to the listed messages based upon the event type, the event source and the date;
   adding the initially processed messages to a results list configured to store a compilation of events that occur over time; and
   further processing the messages from the results list based upon the initial processing by drawing the event code messages from the list of messages to be processed;
   wherein the list of messages to be processed is separate from the results list.

2. The method of claim 1, wherein the set of pre-defined events comprise events that are associated with a television broadcast network, a television series, a television program, a television network environment, or any combination thereof.

3. The method of claim 1, wherein the event type comprises a domain reference describing a scope of the event and an action reference describing an action associated with the event.

4. The method of claim 1, wherein the set of pre-defined events comprise user activities.

5. The method of claim 1, wherein the payload comprises data to be acted upon during the further processing and the initial processing is performed without reference to the payload.

6. The method of claim 1, wherein the further processing is performed by one of a plurality of event handling systems, the event handling system processing a particular message depending upon the event type.

7. The method of claim 6, comprising monitoring the list of messages and the results list.

8. The method of claim 7, comprising increasing or decreasing resources of one of the event handlers based upon a parameter derived from the list of messages or the results list.

9. The method of claim 8, wherein the parameter comprises at least one of length of the list of messages or the results list, or time that a message remains on the list of messages or the results list before further processing, both based on event type.

10. The method of claim 7, comprising increasing or decreasing the number of event handlers processing a particular event type based upon a parameter derived from the list of messages or the results list.

11. The method of claim 8, wherein the parameter comprises at least one of length of the list of messages or the results list, or time that a message remains on the list of messages or the results list before further processing, both based on event type.

12. The method of claim 1, comprising formulating the event data messages via web service calls by the sources.

13. A method for processing event data, comprising:
   receiving event code messages from a plurality of sources, each event code message describing an event, from a set of pre-defined events that may occur at one or more of the plurality of sources, that has occurred at a particular source of the plurality of sources, the event code messages comprising code indicative of an event type corresponding to the event that has occurred, an event source corresponding to the particular source where the event occurred, a date that the one or more pre-defined events occurred, and a payload corresponding to the event that has occurred;
   adding the event code messages to a list of messages to be processed;
   initially processing the listed messages by applying rules to the listed messages based upon the event type, the event source and the date;
   adding the initially processed messages to a results list configured to store a compilation of events that occur over time;
   dynamically increasing or decreasing event handler resources for further processing of the initially processed events based upon a parameter derived from the list of messages or the results list; and
   further processing the messages from the results list via one or more event handlers based upon the initial processing by drawing the event code messages from the list of messages to be processed;

wherein the list of messages to be processed is separate from the results list and the one or more event handlers or resources of the one or more event handlers are allocated based at least in part on an event load, system load, processing time, or combination thereof.

14. The method of claim 13, wherein the parameter comprises at least one of length of the list of messages or the results list, or time that a message remains on the list of messages or the results list before further processing, both based on event type.

15. The method of claim 13, wherein the event handler resources are increased or decreased by increasing or decreasing the number of event handlers.

16. The method of claim 13, wherein the event handler resources are increased or decreased by increasing or decreasing a capacity of an event handler.

17. The method of claim 13, wherein the initial processing is performed without reference to the payload.

18. The method of claim 13, wherein the event type comprises a domain reference and an action reference.

19. The method of claim 13, wherein the event source comprises a source-unique code string persistently indicative of the source.

20. The method of claim 13, wherein the payload comprises data to be acted upon during the further processing.

21. A system for processing event data, comprising:
an event code message initial processing subsystem comprising a processor that receives processor-readable event code messages from a plurality of sources, each event code message describing an event, from a set of pre-defined events that may occur at one or more of the plurality of sources that has occurred at a particular source of the plurality of sources, the event code messages comprising code indicative of an event type corresponding to the event that has occurred, an event source corresponding to the particular source where the event occurred, a date that the one or more pre-defined events occurred, and a payload corresponding to the event that has occurred, the initial processing subsystem being configured to initially process received messages by applying rules to the listed messages based upon the event type, the event source and the date; and a plurality of specialized event handlers configured to perform further detailed processing of the messages based upon the initial processing, wherein at least one of the plurality of specialized event handlers is created subsequent to the initial processing of messages it performs further detailed processing on.

22. The system of claim 21, wherein the number of specialized event handlers is dynamically increased or decreased during receipt of the event code messages.

23. The system of claim 21, wherein a capacity of the specialized event handlers is dynamically increased or decreased during receipt of the event code messages.

24. The system of claim 21, comprising resources accessible to the specialized event handlers and storing data related to the payloads of the event code messages.

25. The system of claim 24, wherein the resources comprise persistent data indicative of the identity of the event sources.

26. The system of claim 21, comprising an application processing interface configured to generate the event code messages.

* * * * *